US008573766B2

(12) United States Patent
Yang et al.

(10) Patent No.: US 8,573,766 B2
(45) Date of Patent: Nov. 5, 2013

(54) DISTRIBUTED LIGHT SOURCES AND SYSTEMS FOR PHOTO-REACTIVE CURING

(75) Inventors: Guomao Yang, Nepean (CA); Sheng Peng, Mississauga (CA)

(73) Assignee: Lumen Dynamics Group Inc., Mississauga (CA)

( * ) Notice: Subject to any disclaimer, the term of this patent is extended or adjusted under 35 U.S.C. 154(b) by 145 days.

(21) Appl. No.: 13/234,200

(22) Filed: Sep. 16, 2011

(65) Prior Publication Data

US 2013/0070035 A1 Mar. 21, 2013

(51) Int. Cl.

| | |
|---|---|
| ***B41J 2/01*** | (2006.01) |
| ***B41J 2/435*** | (2006.01) |
| ***B41J 2/47*** | (2006.01) |
| ***G01D 1/00*** | (2006.01) |

(52) U.S. Cl.
USPC ............ 347/102; 347/235; 347/254; 702/127

(58) Field of Classification Search
None
See application file for complete search history.

(56) References Cited

U.S. PATENT DOCUMENTS 6,324,203 B1 11/2001 Owa
6,683,421 B1 1/2004 Kennedy et al.
7,137,696 B2 11/2006 Siegel
7,152,970 B2 12/2006 Hasebe et al.
7,316,476 B2 1/2008 Yokoyama
7,419,232 B2 9/2008 Hoshino
7,470,921 B2 12/2008 Custer
2006/0023024 A1 2/2006 Niekawa
2006/0038868 A1* 2/2006 Otter ............................. 347/102
2006/0119686 A1 6/2006 Odell
2007/0013757 A1 1/2007 Ohnishi
2008/0151029 A1 6/2008 Yokoyama
2010/0154244 A1 6/2010 Kuta et al.
2010/0309269 A1* 12/2010 Vosahlo et al. ............... 347/102
2011/0221820 A1* 9/2011 Shibata ........................... 347/17

FOREIGN PATENT DOCUMENTS

GB 2352688 2/2001
JP 2008041636 2/2008

* cited by examiner

*Primary Examiner* — Stephen Meier
*Assistant Examiner* — Alexander C Witkowski
(74) *Attorney, Agent, or Firm* — Ridout & Maybee LLP

(57) ABSTRACT

A light source for a photo-reactive curing apparatus is provided, which includes a plurality of light source elements or modules, such as, UV or visible LEDs or LED arrays, arranged to provide a beam profile comprising irradiation zones separated by a dark zone. Photo-polymerization occurs during periods of irradiation and dark polymerization occurs during dark intervals between irradiation. The relative positioning or spacing of light source elements or modules is set to provide an exposure profile with a dark interval which matches the required dark reaction interval for optimal curing efficiency. In modular or adjustable light sources, the spacing is adjustable dependent on process parameters. For processes such as inkjet printing, the beam profile may be better matched to the ink chemistry, so as to control the polymerization reaction to meet a required process speed for single pass or multiple pass applications.

28 Claims, 8 Drawing Sheets

DISTRIBUTED LIGHT SOURCES AND SYSTEMS FOR PHOTO-REACTIVE CURING

CROSS-REFERENCE TO RELATED APPLICATIONS

This application is a continuation application of PCT Application No. PCT/CA2010/000411, entitled "Distributed Light Sources for Photo-reactive curing", filed Mar. 17, 2010, designating the United States, which claims priority from U.S. Provisional Application No. 61/161,281 of the same title, filed Mar. 18, 2009, and is related to U.S. application Ser. No. 12/582,492 entitled "System, Method and Adjustable Lamp Head Assembly for Ultrafast UV Curing", filed Oct. 20, 2009, all of which are incorporated herein by reference in their entirety.

TECHNICAL FIELD

This invention relates to photo-reactive curing of inks, coatings, and other photoreactive materials, and particularly to light sources and systems for improved curing efficiency and print quality for high speed print applications.

BACKGROUND

Many inks, adhesives and other curable coatings comprise free radical based or cationic formulations which may be photo-cured by exposure to light, typically ultraviolet (UV) or short wavelength visible radiation. Applications include curing of large area coatings, adhesive curing, as well as the print processes such as inkjet printing. Curing uniformity is critical for many large area photo-induced curing processes.

For example, UV curable free radical based photo-reactive inks have increased in popularity for use in inkjet printers. Ink jet printers may be used to print on flexible substrates such as polyvinylchloride (PVC) and other flexible polymer materials, and rigid substrates such as metal, wood and plastics. Such inks are usually jetted on top of a substrate with one or more layers and pass under a UV or visible light source for curing. Photo-initiators in the ink formulation are activated by photons, e.g. UV light energy, to create free radicals, which are highly reactive with other components in the ink such as monomers and oligomers. The resulting free-radical initiated polymerization or cross-linking reaction results in a solidified ink layer. In a typical inkjet application, the irradiation period occurs in a fraction of a second or less. When the ink leaves the irradiation zone, the polymerization or solidification may continue, which is referred to as dark reaction. The dark reaction usually does not continue very long. Many people, therefore, consider the free radical polymerization reaction terminates instantly when it leaves the irradiation zone, comparing to the time scale of typical photo-polymerization experiments or typical UV curing processes. In the high speed ink jet printing applications, the dark reaction may, however, be comparable to or even longer than the traveling time between two spatially separated UV irradiation zones and/or the waiting time between adjacent exposures of the same UV source in multiple scanning mode. The polymerization reaction triggered by previous exposures may still be active during a subsequent UV exposure in a multiple UV exposure sequence in a UV ink jet printer printing process. Proper arrangement or adjustment of a UV system in a UV ink jet printer to utilize the dark reaction may allow for more optimized curing and result in a better print quality.

Typical parameters to assess a UV inkjet printer include print quality, print speed, print width, type of substrate, reliability, for example. Among these, the combination of print quality and speed is often considered most challenging. Beside the print heads, which controls how ink droplets are jetted, UV light sources used for curing play an important role in the influence of print quality and speed. Traditional UV light sources used in inkjet printers are typically mercury (Hg) arc lamps and another class of Hg lamp, a microwave or electrode-less bulb, although other gas discharge lamps may also be used. These lamps provide high enough power to cure most types of inks at print speeds used in the industry to date and are used in a wide range of printer systems. However, the amount of heat irradiated from gas discharge lamps is usually very high, which places constraints on system design. Overheating may cause operational and maintenance problems. Excessive heat also limits the ability of inkjet printers to print on some heat sensitive substrates. However, if the lamp power is lowered to avoid deleterious heating effects, there may be a trade off, e.g. in lower print quality and speed, or curing may not be achieved at all.

In recent years, solid state light emitting devices (LEDs), such as light emitting diodes, have been developed as alternative light sources for industrial processes such as photo-reactive or photo-initiated processes, e.g. photo-curing of inks, adhesives and other coatings. LEDs are more energy efficient than traditional gas discharge lamps. Solid state light sources may also be preferred for environmental reasons, as well as longer lifetime. UV LEDs have attracted a lot of attention because they generate less heat and consume less power than gas discharge lamps, for the same usable light output.

However even with the highest power UV LED chips available to date, inkjet printers that solely use UV LEDs for curing still have some problems such as low print quality and/or speed. Under some standard print quality examination tests, print samples produced by UV LED inkjet printers may show evidence of improper cure with surface curing problems, adhesion problem, or color bleeding problems. So there is a need to improve curing processes, for example for applications and processes where LEDs have replaced conventional UV gas discharge lamp light sources.

UV LED sources commonly used in the inkjet industry have LED lines packed close to each other so that jetted ink layers receives continuous irradiation. Many of the applications of UV LED sources in inkjet printers use bare LED chips, dies or arrays with direct illumination so that light is spread out or diffused. Examples of such arrangements are described in US Patent Publication no. US2007/0013757 by Mimaki and in U.S. Pat. No. 7,137,696 to CON-TROL-CURE. These arrangements may have difficulty in achieving an intensity that is high enough for good print quality for some applications. More densely packed LED chips may be provided to achieve high intensity; however liquid cooling may then be required which adds to system complexity and cost. Such UV LED heads are very expensive because of the density and large number of LED chips required.

Efforts to improve curing quality and speed have been focused primarily on providing light sources with higher beam intensities to deliver more power, requiring densely packed LEDs. For example, U.S. Pat. No. 7,470,921 to Summit discloses an apparatus comprising a UV LED device which provides an over focused beam, with a plurality of LEDs being arranged on a concave surface to provide a convergent or focused single beam. This type of focused beam may be overkill, i.e. delivering a high intensity over a short period of time may result in low curing efficiency. For reasons mentioned in copending U.S. patent application Ser. No. 12/582,492, "System, method, and adjustable lamp head assembly for ultra-fast UV curing", while light intensity must be greater than a threshold to initiate photo-reactions, high intensity irradiation may exceed a saturation value, above which light is not utilized efficiently for photo reactions or photo curing.

Also as described therein, dark reactions or dark polymerization can contribute significantly to the final conversion. Thus, it may be preferred to having the ink layer irradiated by the first light beam, followed by a period for dark reaction, having the second UV irradiation by the second light beam, followed by dark reaction and so on so forth. In order to achieve highest curing efficiency, the period for dark reaction may be controlled through UV beam setting and adjusted to match ink chemistry and print speed.

For example, for scanning type inkjet printers with continuous irradiation, although the ink layers may receive multiple UV illuminations (i.e. multiple scans), the period between each illumination is determined e.g. by the configuration of the print engine and one or more light sources, and scanning rate, for the print process and usually does not provide the flexibility of adjustment to match the optimal UV irradiation requirements by the ink chemistry. Typically in known systems, one or two light sources are arranged adjacent to the print head, close enough to the print head to cure newly jetted ink once it is deposited on the substrate, but far enough so that stray light (or heat) does not initiate curing too soon, or adversely affect the ink before or during jetting. The period between each two illuminations may not effectively match the dark reaction requirements of the ink chemistry. In systems providing a focused single beam, such UV sources also do not take advantage of dark reactions effectively. These systems do not provide sufficient control of periods of irradiation vs. dark polymerization for optimizing or improving the cure efficiency.

U.S. patent application Ser. No. 12/582,492, discloses a system, method and lamp head assembly, which addresses some of above-mentioned problems, by providing for an adjustable beam profile, suitable for high speed printing. By allowing for adjustment of the beam profile, this solution provides for better matching of the illumination dependent on process parameters. However, for some applications this solution may not be suitable, or too complex, and alternative or simpler, lower cost solutions may be required.

Also even if the intensity and beam profile of a light source may be adjusted, it does not overcome the disadvantage mentioned above that in scanning type inkjet printers, the period between scans is fixed and dependent on the apparatus and cannot provide control over an interval of dark polymerization between periods of irradiation.

Thus known UV curing systems such as inkjet printers, and particularly scanning type inkjet printers, may not provide sufficient control of the spatial pattern of irradiation, and dark intervals, leading to problems with print quality or curing efficiency for some applications.

SUMMARY OF INVENTION

The present invention seeks to eliminate, or at least mitigate, the disadvantages of known light sources for UV curing systems, or at least provide an alternative.

One aspect of the present invention provides a light source (20,30) for a photo-reactive curing apparatus (1) wherein there is relative motion of the light source and photosensitive material or a substrate or layer comprising photosensitive material (102) to be cured at a predetermined scan speed (v), the light source (20,30) comprising a plurality of light source elements (220,320) wherein the relative spacing ($S_{n,m}$) of the light source elements (220,320) provides a beam profile in a direction (W) of said relative motion of the light source and the substrate comprising at least a first irradiation zone (50) and a second irradiation zone (50) separated by a dark zone (60).

The dark zone may provide a region of lower irradiance between the first and second irradiation zones, and for a predetermined scan speed (v), the spacing ($S_{n,m}$) of light source elements (220,320) is set to provide a desired dark interval between intervals of irradiation.

The dark zone may be a region of relatively low irradiance, so that, for example the irradiance in the first and second irradiated zone is above a threshold for photo-reaction and the irradiance in the dark zone may be below the threshold, or the irradiance in the dark zone may be substantially zero.

In a preferred embodiment the light source may comprise first and second light source elements, the first and second light source elements being spaced apart by a spacing $S_{a,b}$ to provide said first irradiation zone separated from the second irradiation zone by the dark zone.

In another preferred embodiment, the light source may comprise a plurality of light source elements are arranged in groups of at least one light source element, each group comprises at least one light source element for irradiating a respective irradiation zone, and respective adjacent groups n, m being separated by a spacing $S_{n,m}$ to provide the dark zone therebetween.

The light source may comprise a series of light source elements or modules wherein the relative spacing of the light source elements provides a beam profile comprising a first irradiation zone, a dark zone because of the spacing, a second irradiation zone, a second dark zone, and so on so forth. The dark zone may be a relatively low irradiance region between two higher irradiance regions, or a region with no light or very weak light where the intensity may be under a particular threshold for effective photo-reactions.

In preferred embodiments, the light source includes a housing, with mounting means or spacer means, to set or adjust an appropriate spacing between two or more light source elements or modules to optimize a pattern of irradiation, to provide regions of irradiation or illumination, and dark zones, to take advantage of dark reactions during curing, e.g. to match a particular ink chemistry, and/or process speed.

The light source elements may comprise conventional UV lamps, or UV or visible LEDs or LED arrays, for generating visible light or UV radiation of wavelengths suitable for photo-reaction or photo-curing, for applications such as curing of coatings, adhesives, and inks for inkjet or other printing applications. For example, each light source element or sub-assembly may comprise an LED array, e.g. a linear array of 1×n UV LEDs to provide a line or stripe of illumination on a substrate to be cured. By arranging spacing of each LED array to provide first and second regions or zones of irradiation separated by dark zones in which the UV intensity may be relatively low or below threshold for photo-reaction, available power or photon dose may be distributed more effectively to allow dark reactions or dark polymerization, between periods or illumination or irradiation to contribute to effective curing. A distributed arrangement of light source elements may provide more effective use of available energy. Also, a distributed or spaced assembly of a plurality of LED arrays, or groups of LED arrays, may be less expensive, and have reduced cooling requirements relative to expensive, high power, densely packed LED arrays. Such an arrangement may also be preferred for printing or curing on heat sensitive substrates.

One preferred arrangement provides a fixed arrangement of a plurality of linear light sources such as linear LED arrays, with at least one spaced from others in the assembly. The relative positioning or spacing of each light source element may, for example, be preset or preselected by the manufacturer according to the digital print application requirements, i.e. print speed and ink chemistry, and for a particular print apparatus, to provide a distributed optical beam profile with a dark interval to take advantage of dark reactions.

By providing an adjustable arrangement of a plurality of light source subassemblies wherein the relative positioning or spacing of the each can be adjusted, the beam profile may be controlled to provide a pattern of periods of irradiation and intervals for dark polymerization dependent on process parameters, to provide for improved curing efficiency and print quality, for high speed print applications. In some embodiments, the spacing between the light source sub-assemblies also provides advantages for thermal management, and may provide for more efficient cooling. Such an arrangement may be combined with optical elements such as lenses or filters to provide additional control of beam profile and or spacing.

In other preferred embodiments the spacing of light source elements may be adjustable, manually or automatically to provide a desired beam profile with regions of irradiation separated by dark regions (i.e. exposed and unexposed regions). Thus, by using a lamp head assembly comprising a plurality of distributed light sources or sub assemblies that may be spaced apart by pre-selected spacing, or are relatively adjustable, to provide distributed beams from each source of a desired pattern, an overall beam profile can be provided which can be adjusted to provide controlled pattern of exposure of the substrate to be cured to provide for periods of irradiation and intervals of dark polymerization or dark reactions.

Another aspect of the invention provides a photoreactive curing system (1) comprising a light source (20, 30) according to any one of claims 1 to 21. The system may further comprise control/adjustment means (12) for controlling at least an intensity of the plurality of light source elements. The control/adjustment means may comprise means for adjusting the spacing $S_{mn}$ between two or more of the plurality of light source elements (220, 320). The system may further comprise input means for receiving control signals for selecting at least one of light source parameters and spacing $S_{mn}$ of at least one of the lamp head sub-assemblies, to control the beam profile dependent on print speed (v) and other process parameters.

The system may provide for UV curing of photosensitive material or a substrate or layer comprising photosensitive materials (102) to be cured, and may further comprise: means (16) for relatively moving the photosensitive material, substrate or layer to be cured and the light source at a desired traverse (scan) speed (v) for sequentially illuminating areas of the photosensitive material, substrate or layer; and control means (10), the control means including: beam profile adjustment means (12) for controlling lamp parameters of the light source (20,30) to adjust the beam profile, in a direction of relative motion of the substrate and the light source unit, by controlling at least one of relative spacing ($S_{n,m}$) and intensities of the light source elements (220,320), dependent on the traverse speed (v) and other process parameters.

The light source may generate a beam profile comprising first and second irradiation zones (50) separated by a dark zone (60) and wherein the dark zone provides a region of lower irradiance between the first and second irradiation zones, and for a predetermined traverse speed (v), the spacing ($S_{nm}$) of light source elements (220,320) is set to provide a desired dark interval between intervals of irradiation.

Another aspect of the invention provides an inkjet printer comprising a light source as claimed.

By setting proper dark intervals, i.e. adjusting the spacing among the distributed light beams, it is possible to have the UV source setup to match the ink chemistry so that UV beams with specific optical profiles can be delivered to control the polymerization reaction to meet the desired/required process speed not only in single pass applications but also in multiple pass applications. Embodiments of the present invention have particular advantages for both scanning type inkjet printers and fixed head digital print applications for high speed printing, or other applications using light sources for photo-curing where a period between illumination or irradiation is not otherwise adjustable.

In preferred embodiments of the invention, each light source element or sub-assembly comprises at least one UV LED array, for example a linear array of 1×n UV LEDs. Each array may emit at the same wavelength, or one or more arrays may emit different wavelengths, for example to enhance surface curing.

If the spacing of light source sub-assemblies is automatically adjustable, a control system may be provided to allow control of lamp parameters for adjustment of the spacing between lamp sub assemblies dependent on process parameters, similar to that described in detail in U.S. patent application Ser. No. 12/582,492.

Although conventional UV light sources, e.g. arc lamps may alternatively be used in such an arrangement, for many applications LEDs have advantages in terms of e.g. size and form factor, efficiency, power consumption, and cooling requirements. Thus, light sources according to preferred embodiments of the present invention provide an additional parameter, i.e. a light source irradiation interval or dark interval between two or more periods of irradiation that is independent of other printer parameters, such as scanning rate, and may allow higher curing efficiency than traditional continuous UV sources. For example, improved curing efficiency may be achieved by matching the irradiation interval to ink chemistry and printing parameters, such as printing speed, which is not available in current digital printing applications. Curing on heat sensitive substrates may also be facilitated.

The foregoing and other objects, features, aspects and advantages of the present invention will become more apparent from the following detailed description, taken in conjunction with the accompanying drawings, of preferred embodiments of the invention, which description is by way of example only.

BRIEF DESCRIPTION OF DRAWINGS

In the drawings, identical or corresponding elements in the different Figures have the same reference numeral.

DESCRIPTION OF PREFERRED EMBODIMENTS

Figure 1:
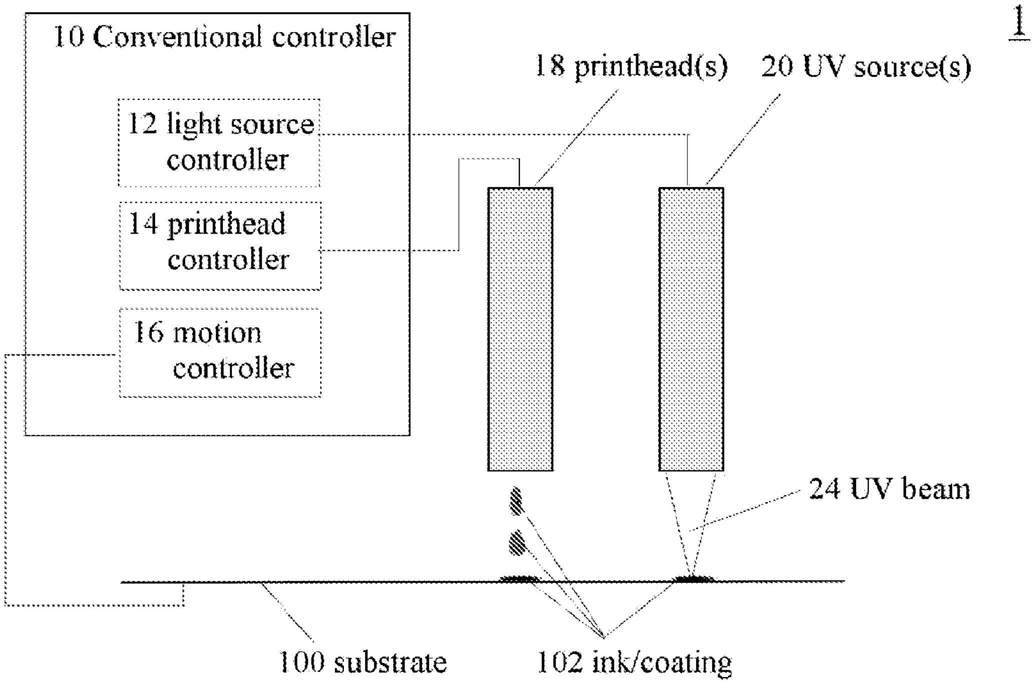
FIG. 1 shows a schematic diagram of a UV curing system according to an embodiment of the present invention.
Figure 2:
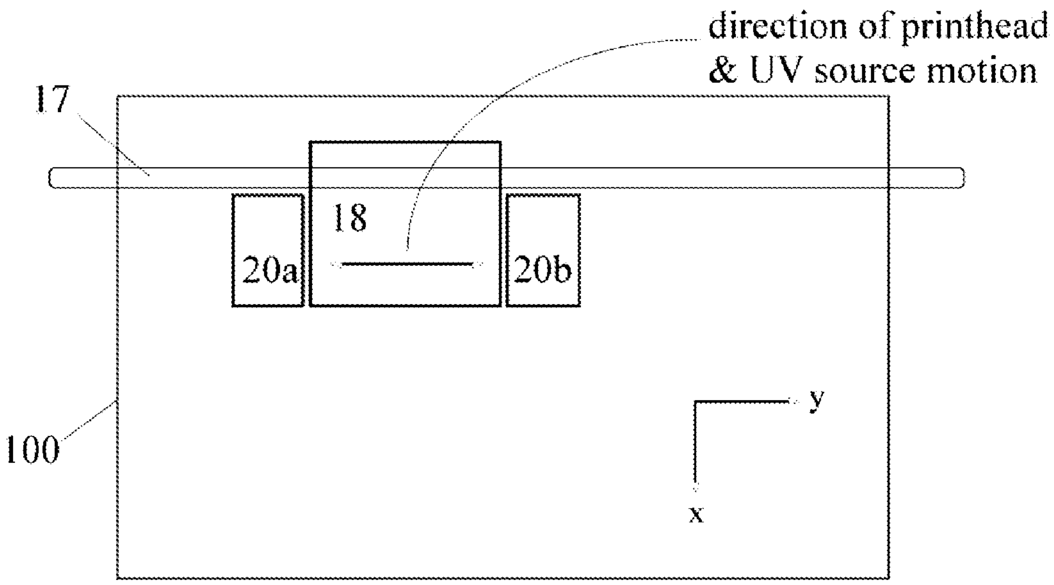
FIG. 2 shows part of a system such as that shown in FIG. 1 comprising a UV inkjet printing arrangement with a scanning print head.
Figure 3:
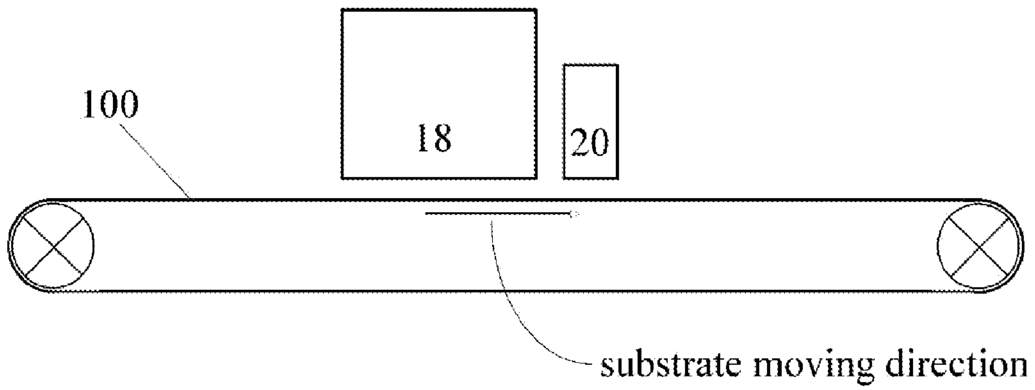
FIG. 3 shows part of a system such as that shown in FIG. 1 comprising a UV inkjet printing arrangement with an array of fixed print heads.

Light sources according to embodiments of the present invention may be used in a UV curing system, and in particular a UV inkjet printer or recording apparatus, such as illustrated schematically in FIGS. 1, 2, and 3. Light sources 20 according to embodiments of the present invention will be described in more detail with reference to FIGS. 4 to 9.

FIG. 1 shows a simplified schematic diagram of elements of a typical UV curing system 1 for use in digital printing applications. The system comprises at least one print head 18 for jetting ink or coating 102 onto a substrate 100 and at least one light source unit or lamp head 20, which comprise one or more light sources sub-assemblies 220*a* . . . 220*n*, as will be described with reference to FIGS. 4 to 9, for generating a UV beam 24 with a desired wavelength and beam profile to illuminate, or irradiate, an area of the coating/substrate 102/100 to cause photo-reaction or photo-curing of the ink and coating 102 on the substrate 100. The system 1 comprises motion controller 16, usually one or more linear motion systems, for relatively moving the substrate 100 and the print engine, which comprises the print head(s) 18 for delivering the ink to be cured, and one or more UV sources 20 (20*a*/20*b* in FIG. 2) for irradiating the substrate at a suitable wavelength or wavelengths, typically UV or short wavelength visible light, to cause photo-reaction or photo-curing. Two typical arrangements of the UV curing system 1 of digital printing applications are shown in FIGS. 2 and 3. That is, the substrate 100 may be moved under the illuminated region from the UV source(s) 20 (FIG. 3), and/or the UV source(s)/lamp assembly 20 may be movable together with the scanning print engine for scanning the illuminated area across the area of the substrate to be printed and cured (FIG. 2). Typically, in printing applications the relative speed (v) between the substrate and the print head, which may be referred to as the scan speed or traverse speed, may be from 0.2 m/s to 2 m/s and for some very high-speed printing applications, the relative speed (v) may be up to 2.5 m/s currently.

Referring to FIG. 1, control means, e.g. control apparatus 10 provides for power and control of the relative movement of the substrate and the print head 18 and other conventional control of the apparatus, such as ink delivery, calibration, lamp adjustment, substrate loading/unloading, emergency stop and other typical functions. The control apparatus 10 also comprises a light source controller 12 which controls parameters of the lamp head assembly 20, such as intensity, and other parameters related to the beam profile as will be described in more detail with reference to FIGS. 4 to 9. Print head controller 14 controls parameters to operate inkjet print heads, e.g. jetting frequency, jetting pattern, grey scale, color calibration, and other parameters related to ink delivery. The motion controller 16 controls the relative movement of substrate 100 and the print engine comprising the print head(s) 18 and UV source(s) 20. It allows for accurate position calibration and other movements such as loading and unloading if any.

FIG. 2 shows a typical configuration for a scanning UV inkjet printer setup where the print engine comprising the print heads 18 and UV sources 20 carries two UV lamps 20*a* and 20*b*. For reference, xy axes are indicated in the figures, to assist in describing the relative motion of the parts. The print heads 18 and UV lamp heads 20, move together along a fixed guide rail 17, to and fro, along the y axis across the substrate 100, jetting ink and exposing the ink to UV irradiation, over a band or slot of the substrate exposed under the lamp heads 20*a* and 20*b*. In general, after one or more scans, the substrate advances (is moved) one step size or slot width. The step size (slot width) is typically determined by the printer manufacturer, to match the jetting patterns of the inkjet print heads 18, and is in general between 1 cm and 7.5 cm. Thus, in this range, the step size is smaller than the illuminating beam dimension in the x direction, in order to print and cure the next slot or band of jetted inks. Typically for scanning wide format printing applications, the print width, i.e. the effective scanning/jetting distance of print heads 18 is from 1 m to 5 m, so the interval between two UV irradiations from different scans on the same ink layer slot is typically 2 seconds or more, which is usually too long for dark reactions to be utilized effectively for optimizing curing efficiency with the general consideration that UV curing happens in a fraction of second. In addition, the interval between two UV irradiations from different scans is limited by the printing process and is not easy to adjust for different printing processes.

FIG. 3 is another typical configuration for a UV inkjet printer with fixed print heads 18 and UV sources 20 extending across the substrate 100. In this single pass arrangement for digital printing applications, ink layers jetted by print heads 18 on top of the substrate 100 only get single chance of UV irradiation by UV sources 20 as the substrate 100 passes under the printhead 18 and the light source 20. This arrangement, in which the substrate 102 is moved under the fixed print heads 18 and UV lamps 20 extending across the transverse direction of the substrate to cover the whole width of the substrate 100, has applications in label printing, card printing, and in some cases wide format printing as well. As this arrangement allows for only single pass printing, the required ink jetting speed and curing speed are generally very fast.

In general, for both arrangements described by FIGS. 2 and 3, the exposed area may be characterized by a dimension L, which is perpendicular to the relative movement direction between print engine and substrate 100 and the other dimension W along the relative movement direction between print engine and substrate 100. For inkjet printing applications, the optical intensity profile is preferably uniform in dimension L of the UV sources 20. The beam intensity profile along the other dimension W, that is, along the direction of relative movement of the substrate 100 during UV exposure is more important in determining the temporal exposure of the substrate during printing for a better or more controlled curing.

Light source units according embodiments of the present invention, which will be described in detail below, may produce special optical intensity profile in dimension W comprising focused and/or unfocused beam profiles to provide appropriate intervals of irradiation with appropriate spacing among them matching the required optimal time interval for dark reactions between intervals of photo-irradiation for a better curing efficiency or enhanced ink film quality.

Figure 4:
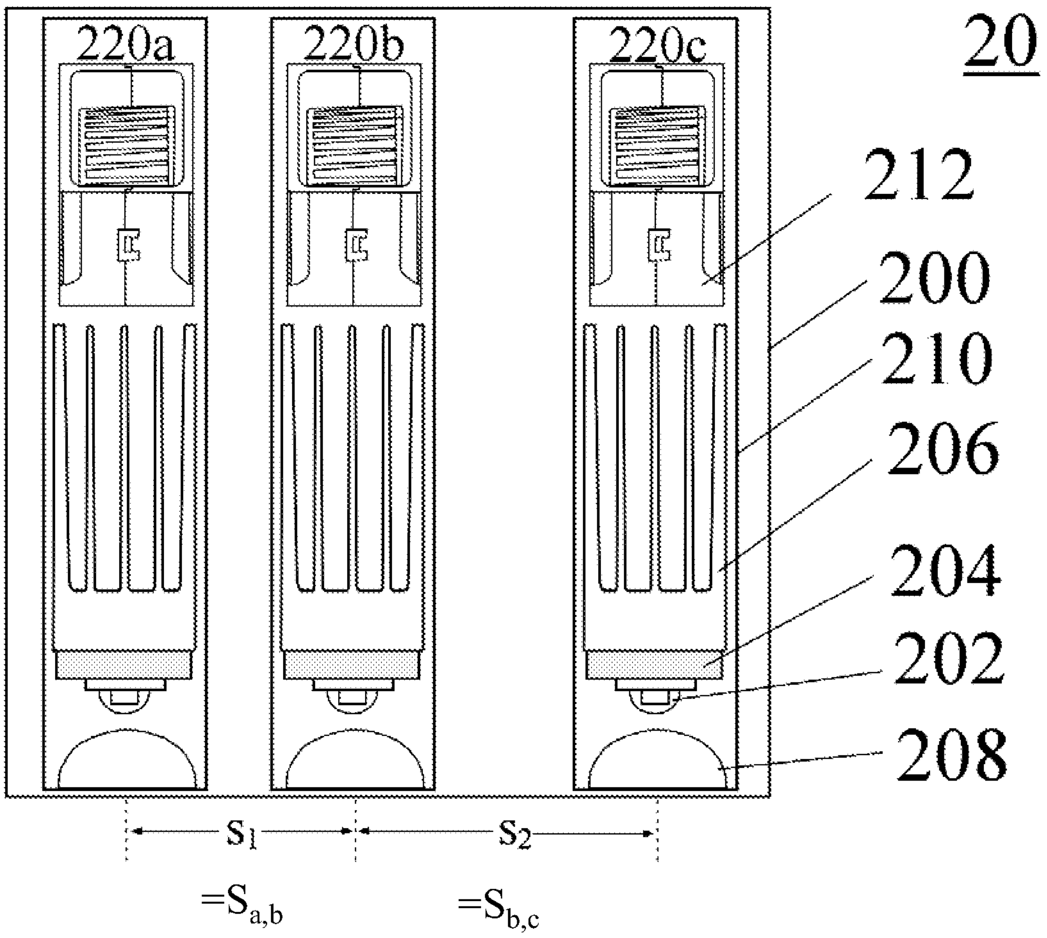
FIG. 4 shows a cross-sectional view of a simplified block diagram showing a lamp head comprising an adjustable arrangement of lamp head subassemblies according to a first embodiment, for producing a distributed light beam.
Figure 5:
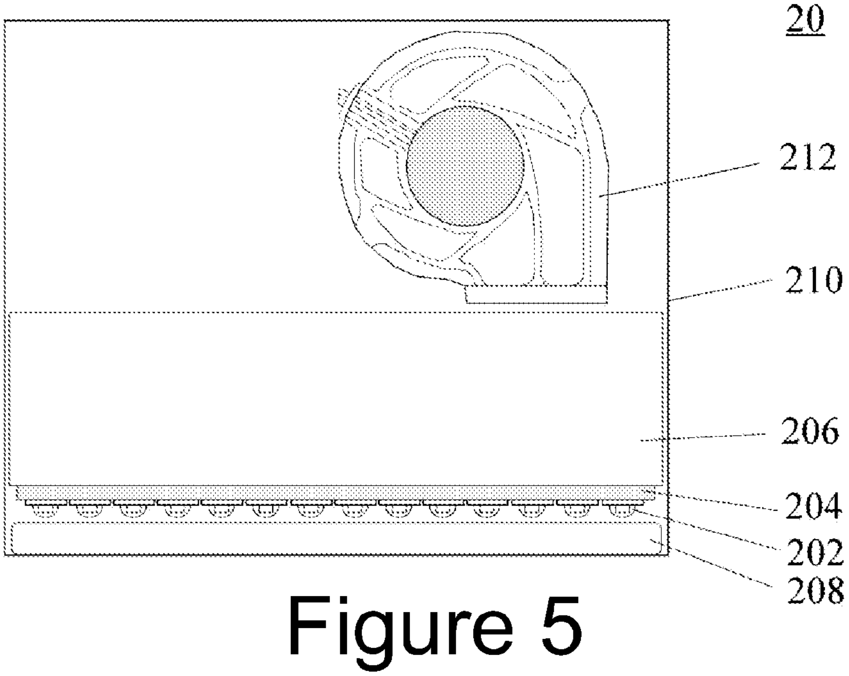
FIG. 5 shows another cross-sectional view, in a direction perpendicular to the side view shown in FIG. 4 of a lamp head subassembly of the first embodiment.
Figure 6:
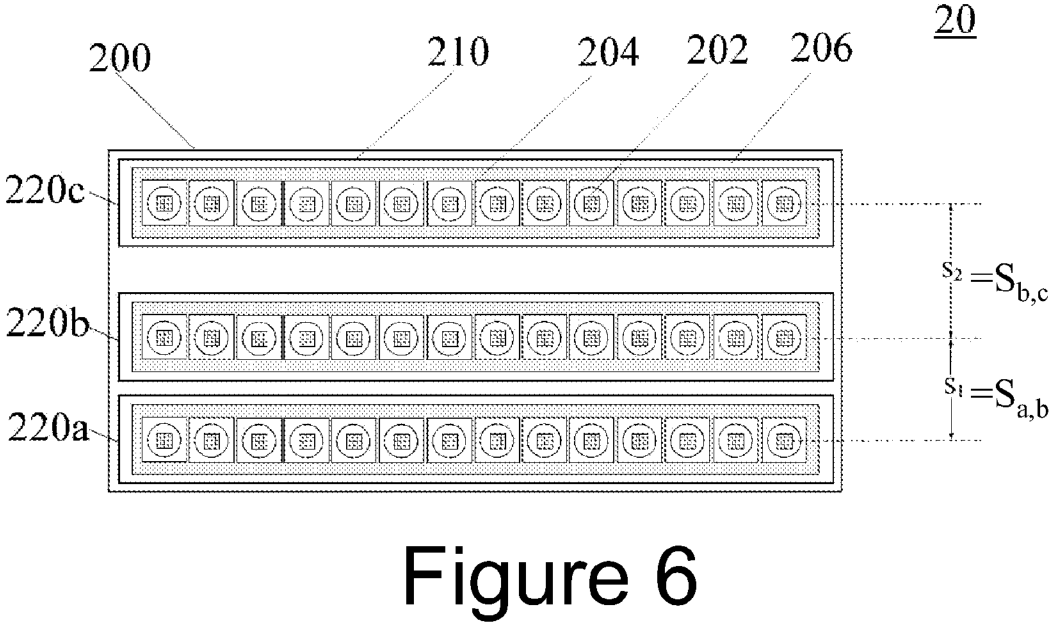
FIG. 6 shows a bottom view of the lamp head of the first embodiment comprising an adjustable arrangement lamp head subassemblies each comprising a linear arrays of UV LEDs.

Typically, as shown schematically in FIG. 1, conventional known light sources provide a narrow, intense, focused beam profile, over the illuminated area of the substrate 26 passes under the light source 20. In contrast, the light source unit 20 according to a first embodiment of the present invention, as shown in FIGS. 4 to 6 comprises a plurality of light source elements or sub-assemblies 220*a*, 220*b*, 220*c*, mounted within a frame or housing 200, wherein the spacing $S_1$ (i.e. $S_{a,b}$) between 220*a* and 222*b*, and spacing $S_2$ (i.e. $S_{b,c}$) between 220*b* and 220*c* is arranged to provide a particular pattern of irradiation, as shown for example in FIG. 10 or FIG. 11, where regions or intervals of irradiation 50 are separated by a "dark region" or "dark zone" 60, that is, a region or interval where the substrate is not exposed to radiation, or is exposed only to low irradiation which may be below a threshold value for photoreaction, where dark reactions or dark polymerization take place. Irradiation zones 50, or regions or intervals of irradiation or illumination, in this context, are to be understood as regions above a threshold intensity for photoreaction or photo-curing.

The spacings between individual light source subassemblies 220*a*, 220*b*, and 220*c* provide additional parameters, which control the light source irradiation interval, i.e. an interval between two periods of illumination, which is independent of other printer parameters, such as scan frequency. By appropriate selection of the beam profile to provide intervals of irradiation at selected intensities, and spacings that provide a dark interval between periods of irradiation, the irradiation pattern may take advantage of dark reactions or dark polymerization to improve curing efficiency relative to traditional UV sources which tend to provide a single, continuous, intense focused beam of maximize intensity. In some applications, improved curing efficiency is achieved by matching the irradiation intensity and interval to ink chemistry and printing parameters, such as printing speed, so as to provide further control over print parameters which is not available in current digital printing systems.

Referring to the embodiment shown in FIGS. 4 to 6, each distributed light source 20 comprises a plurality of light source elements or lamp head sub-assemblies, e.g. three units 220*a*, 220*b*, 220*c* as illustrated, or an arbitrary number, wherein at least two of the sub assemblies have a particular spacing arrangement to provide for an interval of lower illumination, or a dark zone, to take advantage of dark reactions or dark polymerization, as well as curing during photo-irradiation. By providing a suitable spacing between light source subassemblies, an additional parameter, i.e. a light source irradiation interval, may be provided which is independent of other printer parameters. In some applications, such as digital printing, improved curing efficiency may be achieved by matching the irradiation interval to ink chemistry and printing parameters, such as printing speed (v).

Referring to FIGS. 4 to 6, a lamp head 20 according to a first embodiment comprises a fixed arrangement of, for example, three similar light source elements, in the form of a lamp head sub-assemblies, 220*a*, 220*b*, and 220*c*, each comprising a linear LED array 202 and providing a line of illumination, in which the spacings between lamp head subassemblies, $S_1$ and $S_2$ (i.e. $S_{a,b}$ and $S_{b,c}$) are preselected for a particular process, or to be suitable for the most common applications and processes. Each lamp head subassembly 220*a*, 220*b*, and 220*c* has its own housing 210, containing cooling means in the form of a heat sink 206 in thermal contact with the substrate 204 on which the LED array 202 is mounted, and a fan 212. An optical element in the form of a lens 208 is also provided to shape the beam profile of the LED array. The three subassemblies 220*a*, 220*b*, and 220*c* are mounted within a frame or housing 200, which provides a mounting that sets the spacings $S_1$ and $S_2$.

In one preferred embodiment, the spacings $S_1$ and $S_2$ are fixed, or preset at the time of manufacture, to match process requirements of a particular printing apparatus and process parameters or suitable for a range of more common standard processes and applications.

In alternative preferred embodiments, the light source 20 is similar to that shown in FIGS. 4 to 6 except that the spacings $S_1$ and $S_2$ between lamp head sub-assemblies 220*a*, 220*b*, and 220*c* are adjustable. It will be appreciated that various mounting arrangements may be provided to allow adjustment of the spacing of the light source elements, either manually, or automatically. Spacings may be continuously adjustable, or provide for adjustment between two or more preset spacings. Further adjustment of the dark zone may also be achieved through power control of individual LEDs or groups of LEDs.

Because the dark reaction is closely linked to ink chemistry and the relative speed (v) between the light source and substrate (i.e. the scan speed or traverse speed), the optimal spacing among subassemblies may provide time intervals of no irradiation or low irradiation in an optimal region. The optimal interval for dark reaction is in a range such that in the dark zone the polymerization reaction rate does not drop too low for effective cure. Currently the relative speed (v) between light source and substrate is usually between 0.1 m/s and 2.5 m/s. Such speed range together with current ink formulation technology will make the optimal dark zone in the range between 1 ms and 10 s, more preferably between 5 ms and 5 s. With the process speed information, the optimal spacing range among subassemblies or sub-elements can be determined. For example, for a process speed (v) of 1 m/s allowing a dark interval of 10 ms, the spacing of the light source elements would be 10 mm.

Intensity profile adjustment can influence or improve the film quality as well as the curing efficiency. Once the polymerization reaction is started with proper irradiation, i.e. above threshold for photo-reaction and generation of free radicals or start points, the polymer chains will grow or propagate to form a network whether or not light is present before termination. The network formation and its quality are controlled by several mechanisms in the system. Too many new start points generated at once may not necessarily build a strong polymerization network. Thus, appropriate spacing of multiple light source elements using a distributed light source as described herein, with particular pattern of irradiation and dark zones, provides a novel approach to take advantage of dark reactions more effectively for having a better curing quality.

Figure 7:
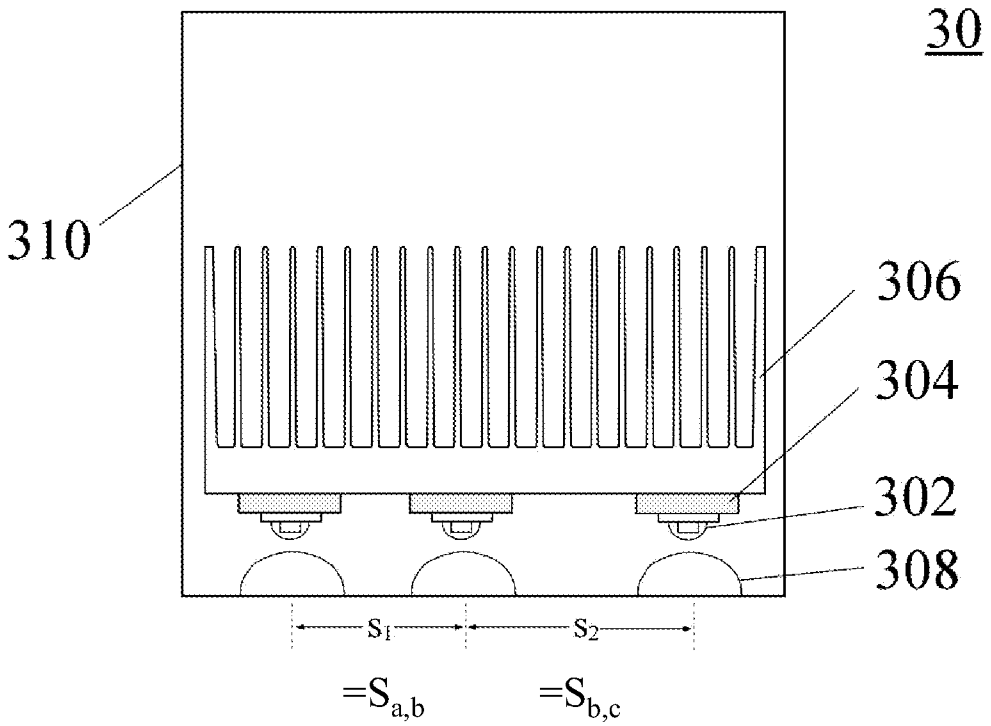
FIG. 7 shows a cross-sectional view of a simplified block diagram showing lamp head according to a second embodiment, comprising a fixed arrangement of lamp head subassemblies with shared cooling mechanism, for producing a distributed UV light beam.
Figure 8:
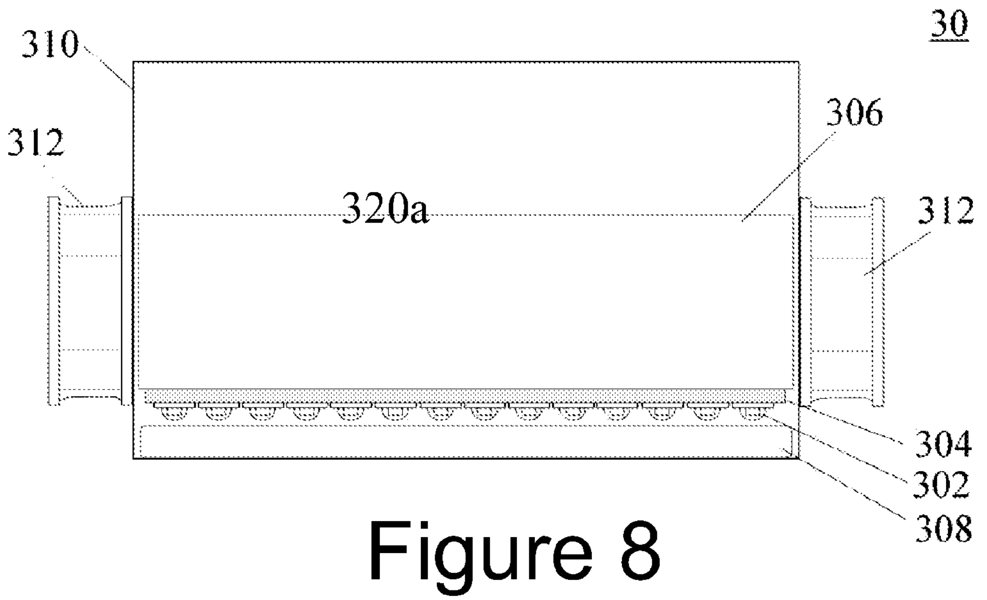
FIG. 8 shows a side view of the lamp head of the second embodiment shown in FIG. 7 comprising linear LED arrays.
Figure 9:
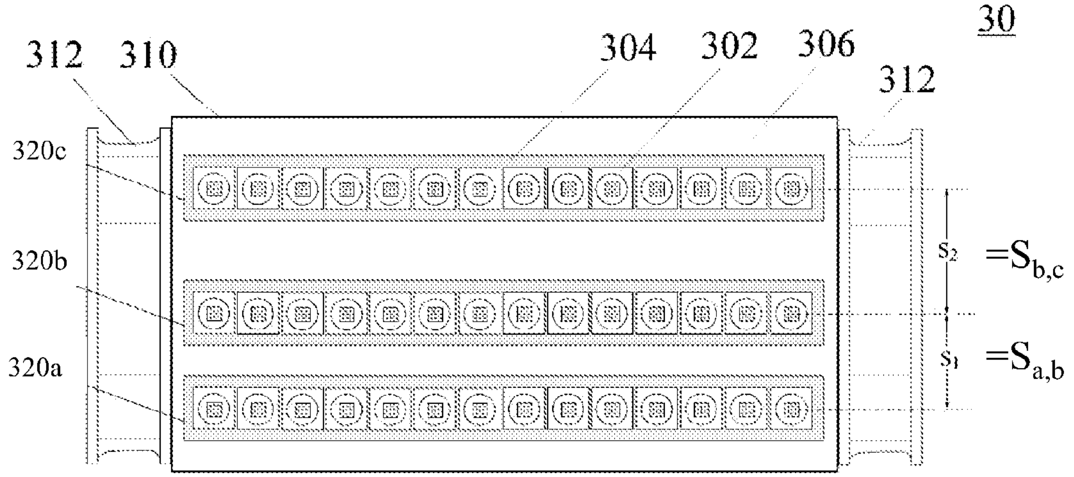
FIG. 9 shows a bottom view of the lamp head of the second embodiment shown in FIG. 7, comprising linear LED arrays.

In a lamp head assembly according to another embodiment of the present invention, a UV light source is provided that comprises a single assembly 30 as shown in FIGS. 7, 8, and 9 which comprises a plurality of light source elements, i.e. linear arrays of LEDS 302 mounted within a single enclosure or housing 310. Each linear LED array comprises a PCB 304 with UV LEDs 302 and mounted, i.e. soldered on the same substrate, sharing one cooling component such as heat sink

306, which may also comprise one or more heatpipes (not shown). The three PCBs 304 carrying the LED arrays are aligned with a space $s_1$, $s_2$ ($S_{a,b}$ and $S_{b,c}$) between each adjacent PCB pair to produce similar spacing between optical beam profiles as generated by the subassemblies as above (e.g. the profiles shown in FIG. 10 or 11). Optionally, optical elements such as a lens or lens array 308, as shown in FIG. 7, may be used in front of the LEDs 302 within the lamp head enclosure 310 to achieve high enough intensity with different optical profiles. Lens or lens array 308 may be avoided if the intensity and/or optical beam profile are optimal for efficient cure. FIG. 8 shows another side view of the apparatus that is perpendicular to the cross section side of FIG. 7. A cooling fan 312 is mounted at each end of the lamp head 30 to cool the heat sink/heat pipe 306.

FIG. 9 shows a bottom view of the lamp head 30, showing the 3 linear LED arrays 302, with optional lens/lens array 308 removed. The spacings $s_1$, $s_2$ ($S_{a,b}$ and $S_{b,c}$) between LED arrays 302, which are preselected by the lamp manufacturer according to the printing process requirements i.e. ink chemistry and printing speed, allows the lamp head 30 to produce specific spatial pattern of the UV beam irradiated to ink/coating layers that is taught in the present application.

It will be appreciated that in other embodiments, alternative arrangements for cooling may be provided. That is, cooling fans 312 may be mounted in other positions, e.g. on top of the heat sink/heat pipe 306 to provide proper cooling as well and cooling fans 312 may be avoided if proper cooling is achieved by the heat sink/heat pipe 306 alone.

It will also be appreciated that other arrangements of two or more LED arrays in a fixed arrangement with appropriate spacing of individual arrays or groups of arrays, with shared cooling provides a simpler, and a more cost effective light source which provide first and second illumination or irradiation zones separated by a dark zone. Beneficially, a minimum number of LEDs may be provided in the light source to provide the required pattern of irradiation, and sufficient intensity for effective curing. Thus, when a fixed pattern of irradiation with a dark interval is required, such an arrangement is less expensive than selectively illuminating a dense array of LEDs, or masking or blocking light to provide a dark zone.

Modular Arrangements

Figure 12:
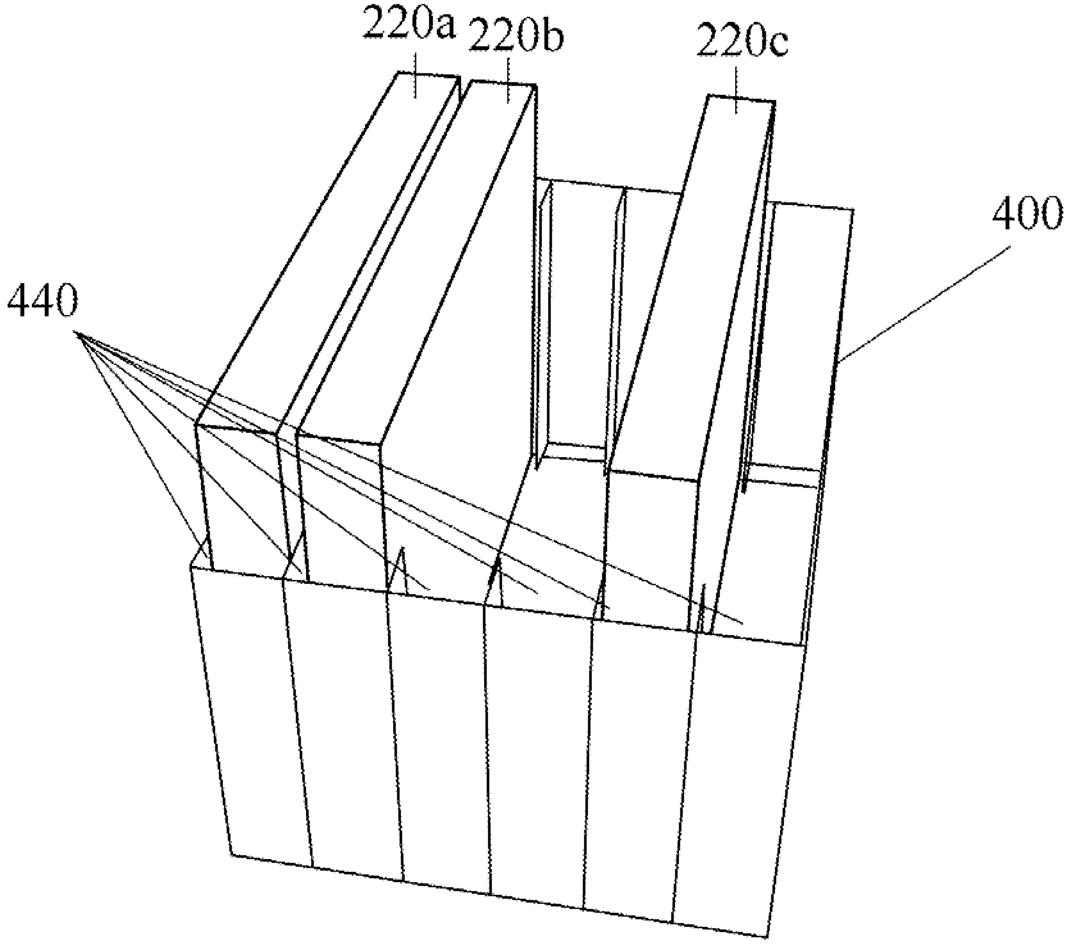
FIG. 12 shows a modular form of arrangement for light source elements with each module removably mounted in slots.

In another embodiment, as shown in FIG. 12 the light source elements or sub-assemblies may be provided in modular form, and each modular light source elements 220*a*, 220*b*, or 220*c* is removably mountable into one of a plurality of slots 440 in the housing 400. Thus a plurality of light source elements can be grouped in adjacent slots, or a slot may be left empty to provide a larger spacing and therefore a longer dark interval between a first group of one or more modules, and a second group of one or more modules. Conveniently, different modules may be removably mounted within slots, or other suitable mounting arrangements, to allow for different beam profiles, with varying spatial patterns of irradiation and dark intervals. It will also be appreciated that while slots 440 are described and shown for accepting modular light source elements, other suitable mounting means or alignment/spacer means, such as rails, connectors, et al., may be provided for appropriately connecting and spacing the modules within the housing or enclosure 400 of the light source.

Figure 10:
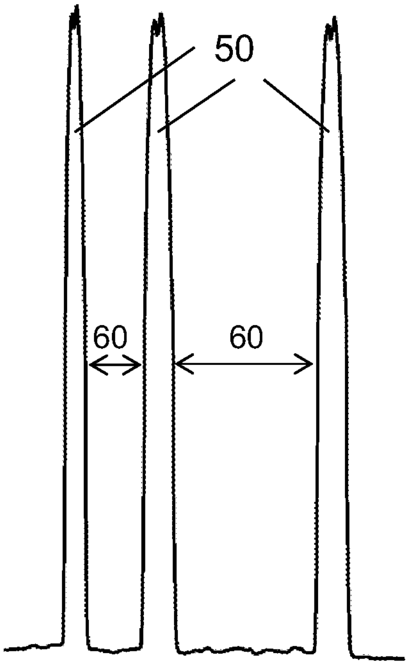
FIG. 10 shows an example of an optical profile produced by the UV LED source according to the first or second embodiments shown in FIGS. 4-9.
Figure 11:
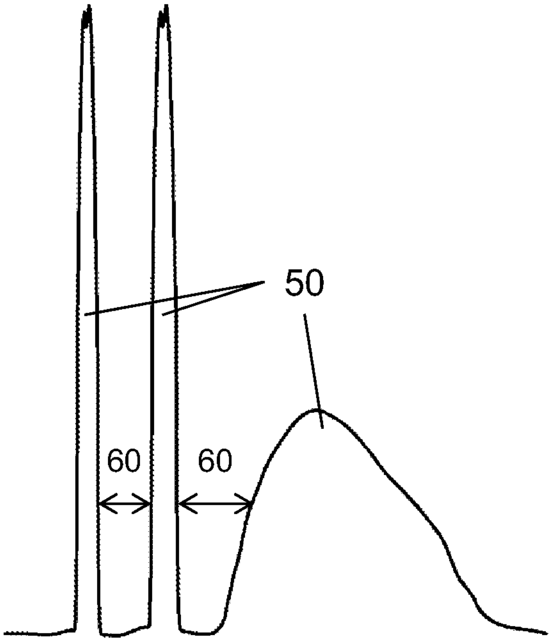
FIG. 11 shows another example of an optical profile produced by the UV LED source as shown in FIGS. 4-9.

When each sub-assembly or lamp element is provided as a separate module, e.g. in its own a housing with its own cooling and optical elements, as illustrated in FIGS. 4, 5, and 12, a user has the flexibility to adapt the arrangement of sub-elements for different applications. A customer may, for example, select from one to whatever number of such units and stack them together, with appropriate spacers, with freedom to adjust spacings among them as required for a particular process When multiple light sources are used in one lamp head assembly, for example, in an LED array comprising a plurality of LEDs, the light sources may be addressable as described in U.S. Pat. No. 6,683,421 assigned to the present assignee, to enable control of power to individual lamps, or groups of lights sources (LEDs), to control the beam profile accordingly. For example in the embodiments shown in FIG. 9 the three LED arrays 320*a*, 320*b*, and 320*c* may be separately controlled to adjust the overall beam profile, for example, to provide beam profiles as shown in FIGS. 10 and 11.

Further embodiments will now be described which are particularly advantageous for UV inkjet applications, where it is desirable to control the spatial pattern of the irradiation source. As the substrate 100 passes under UV sources 20, the relative movement turns the spatial pattern of the light source into temporal irradiation as seen by ink/coating layers to be cured. This temporal pattern of irradiation is closely linked to the UV polymerization reaction as taught in copending U.S. patent application No. 61/139,203, "System, method, and adjustable lamp head assembly for ultra-fast UV curing". In particular, it is possible to provide more precise control over the period of illumination, to induce photo-polymerization, and intervals without illumination, to allow for dark polymerization to contribute to curing, and thereby improve curing efficiency and/or print quality. Although the embodiments described above comprise UV LED light sources, in alternative embodiments, each subassembly can be LEDs or LED arrays emitting other wavelengths suitable for photo-curing or photo-initiation, e.g. blue light LEDs emitting at ~400 nm. Alternatively, other types UV light source, such as UV arc lamps or other known types of light source. In some applications one or more light source sub assemblies, which emit different wavelengths, e.g. different UV wavelengths, or other visible wavelengths, or microwave wavelengths may be used. Similarly, although sub-assemblies of linear arrays of LEDs are described, other configurations are contemplated, such as curved arrays, ring shaped or cylindrical arrays, or other arbitrarily arranged light sources, for example, for irradiating products of particular shapes, and these arrays which may also, for example, be addressable arrays, such as described in U.S. Pat. No. 6,683,421 assigned to the present assignee. It will be appreciated that the patterns of irradiations, such as, lines of illumination provided by distributed light source elements comprising linear LED arrays, as described above, can be generated by different types of UV or visible LEDs, e.g. different wavelength and view angle. Optionally, optical elements, such as lenses or reflectors, may be used to shape the beam profile from an LED or LED array. It will also be appreciated that spatial irradiation patterns of this type can be generated not only by UV LEDs, but also by other types of UV sources or combinations, such like arc lamp, microwave lamps. In the example of arc lamps, one high power arc lamp source in a conventional light source for a UV curing apparatus can be replaced by several low power arc lamps distributed spatially with distance among these lamp heads. Such an arrangement greatly reduces cooling requirements for each lamp. In addition, distributed lamp heads allow more heat sensitive substrates to be printed, because dark intervals allow for heat dissipation and lower substrate temperatures during processing.

Industrial Applicability

Distributed light sources are provided which comprises a plurality of light source elements or sub-assemblies with specific spacings between the sub-assemblies, to provide particular photo-irradiation patterns, which are suitable for photoreactive curing applications, such as UV inkjet curing applications, where dark reactions as well as reactions during photo-irradiation may contribute to effective curing. In particular, since at least one light source element or sub-assembly is spaced from other elements or sub-assemblies, the beam profile may provide a region of low intensity or dark zone. Appropriate fixed or adjustable spacing of the sub-assemblies or modules provides the appropriate interval for dark reaction between periods of illumination. This arrangement provides for improved control of a photo-irradiation pattern, to allow for improved curing speed and quality, particularly when dark polymerization as well as photo induced polymerization contributes effectively to the curing process.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A light source (20,30) for a photo-reactive curing apparatus (1) wherein there is relative motion of the light source and photosensitive material or a substrate or layer comprising photosensitive material (102) to be cured at a predetermined scan speed (v), the light source (20,30) comprising a plurality of light source elements (220,320) wherein the relative spacing ($S_{n,m}$) of the light source elements (220,320) provides a beam profile in a direction (W) of said relative motion of the light source and the substrate comprising at least a first irradiation zone (50) and a second irradiation zone (50) separated by a dark zone (60).

2. A light source for a photo-reactive curing apparatus according to claim 1 wherein the dark zone provides a region of lower irradiance between the first and second irradiation zones, and for a predetermined scan speed (v), the spacing ($S_{n,m}$) of light source elements (220,320) is set to provide a desired dark interval between intervals of irradiation.

3. A light source for a photo-reactive curing apparatus according to claim 1 wherein the first and second irradiation zones provide an irradiance above a threshold for photoreaction and the dark zone provides an irradiance below the threshold.

4. A light source for a photo-reactive curing apparatus according to claim 1 wherein irradiance in the dark zone is substantially zero.

5. A light source for a photo-reactive curing apparatus according to claim 1 comprising first and second light source elements, the first and second light source elements being spaced apart by a spacing $S_{a,b}$ to provide said first irradiation zone separated from the second irradiation zone by the dark zone.

6. A light source for a photo-reactive curing apparatus according to claim 1, wherein the plurality of light source elements are arranged in groups of at least one light source element, each group comprises at least one light source element for irradiating a respective irradiation zone, and respective adjacent groups n, m being separated by a spacing $S_{n,\,m}$ to provide the dark zone therebetween.

7. A light source according to claim 1 wherein each light source element comprises one of a UV/visible lamp, a UV LED, a UV LED array, a visible LED, a visible LED array.

8. A light source for a photo-reactive curing apparatus according to claim 1 wherein each light source element comprises a LED array, and wherein the plurality of LED arrays are arranged in groups of at least one LED array, each group for irradiating a respective irradiation zone, and each group (n, m) of at least one LED array being separated by a respective spacing $S_{n,\,m}$ to provide the dark zone therebetween.

9. A light source according to claim 8 wherein each LED array is a linear LED array, the plurality of LED arrays being mounted within a housing, and at least two LED arrays (m,n) separated by a spacing $S_{n,m}$ to provide first and second linear irradiation zones with a dark zone therebetween determined by the spacing $S_{n,m}$.

10. A light source for a photoreactive/photocuring apparatus according to claim 1 comprising a housing, and means for mounting each light source element within the housing separated by a respective spacing $S_{n,m}$.

11. A light source for a photoreactive/photocuring apparatus according to claim 10 further comprising cooling means for cooling the light source elements.

12. A light source unit for a photoreactive/photocuring apparatus according to claim 11 further comprising optical elements for shaping the beam profile.

13. A light source for a photoreactive/photocuring apparatus according to claim 10 wherein each light source element comprises at least one LED array and forms a sub-assembly, and each sub-assembly is mountable within a housing separated by a respective spacing $S_{n,m}$.

14. A light source for a photoreactive/photocuring apparatus according to claim 8 wherein each group of at least one LED array comprises a sub-assembly, and each sub-assembly comprises at least one of a) cooling means and b) optical elements for shaping the beam profile from the sub-assembly.

15. A light source for a photoreactive/photocuring apparatus according to claim 13 each sub-assembly comprises at least one of a) cooling means and b) optical elements for shaping the beam profile from the sub-assembly.

16. A light source for a photoreactive/photocuring apparatus according to claim 13 wherein at least one sub-assembly is adjustably mountable with the housing to adjust a respective spacing $S_{n,m}$.

17. A light source for a photoreactive/photocuring apparatus according to claim 13 wherein each sub-assembly comprises a module which is removable from the housing, and the housing provides mounting means for removably mounting a plurality of said modules.

18. A light source for a photoreactive/photocuring apparatus according to claim 17 wherein the mounting means comprises a plurality of slots each for receiving one of said removable modules, and the slots providing for at least two modules to be spaced apart by a respective spacing Sm,n.

19. A light source unit according to claim 11 wherein the cooling means comprises one or more of a fan, a heatsink, and a heatpipe.

20. A light source according to claim 1 comprising spacer means for setting the spacing between two or more light source elements or light source modules.

21. A light source according to claim 1 wherein, for a scan speed (v) in the range from 0.1m/s to 2.5m/s, the spacing ($S_{n,m}$) between two or more light source elements (220,320) provides a dark interval in the range between 1ms and 10s.

22. A photoreactive curing system (1) comprising a light source (20, 30) according to claim 1.

23. A photoreactive curing system according to claim 22 further comprising control/adjustment means (12) for controlling at least an intensity of the plurality of light source elements.

24. A photoreactive curing system according to claim 23 wherein the control/adjustment means comprises means for adjusting the spacing $S_{mn}$ between two or more of the plurality of light source elements (220, 320).

25. A photoreactive curing system according to claim 24 further comprising input means for receiving control signals for selecting at least one of light source parameters and spacing $S_{mn}$ of at least one of the lamp head sub-assemblies, to control the beam profile dependent on print speed (v) and other process parameters.

26. A system according to claim 22 for UV curing of photosensitive material or a substrate or layer comprising photosensitive materials (102) to be cured, ; further comprising:

means (16) for relatively moving the photosensitive material, substrate or layer to be cured and the light source at a desired traverse (scan) speed (v) for sequentially illuminating areas of the photosensitive material, substrate or layer; and control means (10), the control means including:

beam profile adjustment means (12) for controlling lamp parameters of the light source (20,30) to adjust the beam profile, in a direction of relative motion of the substrate and the light source unit, by controlling at least one of relative spacing ($S_{n,m}$) and intensities of the light source elements (220,320), dependent on the traverse speed (v) and other process parameters.

27. A system according to claim 26, wherein the light source generates a beam profile comprising first and second irradiation zones (50) separated by a dark zone (60) and wherein the dark zone provides a region of lower irradiance between the first and second irradiation zones, and for a predetermined traverse speed (v), the spacing ($S_{nm}$) of light source elements (220,320) is set to provide a desired dark interval between intervals of irradiation.

28. An inkjet printer comprising a light source according to claim 1.

* * * * *